United States Patent [19]
Hiyama et al.

[11] Patent Number: 6,094,240
[45] Date of Patent: Jul. 25, 2000

[54] LIQUID CRYSTAL DISPLAY POLARIZING BEAM SPLITTER WITH SPECIFIC INCIDENCE ANGLE

[75] Inventors: Ikuo Hiyama; Osamu Itoh, both of Hitachi; Katsumi Kondo, Hitachinaka; Masaya Adachi, Hitachi, all of Japan

[73] Assignee: Hitachi, Ltd., Tokyo, Japan

[21] Appl. No.: 08/922,754

[22] Filed: Sep. 3, 1997

[30] Foreign Application Priority Data

Sep. 4, 1996 [JP] Japan .................................. 8-234039

[51] Int. Cl.⁷ ......................... G02F 1/1335; G02B 5/30
[52] U.S. Cl. .................. 349/9; 349/8; 349/5; 359/494; 359/495
[58] Field of Search ................. 349/9, 8, 5, 197; 359/488, 492, 491, 490, 495, 253, 500, 494

[56] References Cited

U.S. PATENT DOCUMENTS

| | | | |
|---|---|---|---|
| 4,913,529 | 4/1990 | Goldenberg et al. | 350/337 |
| 5,217,794 | 6/1993 | Schrenk | 428/220 |
| 5,347,380 | 9/1994 | Lehureau | 349/9 |
| 5,555,186 | 9/1996 | Shioya | 359/40 |
| 5,729,306 | 3/1998 | Miyake et al. | 349/9 |
| 5,748,369 | 5/1998 | Yokota | 349/9 |
| 5,867,316 | 2/1999 | Carlson et al. | 359/500 |
| 5,898,521 | 4/1999 | Okada | 359/487 |

*Primary Examiner*—William L. Sikes
*Assistant Examiner*—Kari M. Horney
*Attorney, Agent, or Firm*—Antonelli, Terry, Stout & Kraus, LLP

[57] ABSTRACT

In a polarizing beam converter, a uniaxial anisotropic transparent medium is inserted and supported between isotropic transparent media; and an optical axis of said uniaxial anisotropic transparent medium is arranged almost perpendicular to an incident light beam or an incident face of the incident light beam at an interface between the isotropic transparent medium and the uniaxial anisotropic transparent medium. A half wavelength plate is placed with an inclined angle of 45° relative to a polarization axis for either of a reflected light component or a transmitted light component at the interface. The retractive index of the isotropic medium, $n_p$, and a refraction index $n_e$ greater than $n_0$, of the uniaxial anisotropic transparent medium are substantially equal to one another. Further, at the interface of the isotropic medium and the uniaxial anisotropic transparent medium, an incident angle satisfying $\sin(\theta) \geq n_0/n_p$ for satisfying a total reflection angle.

16 Claims, 4 Drawing Sheets

FIG.3
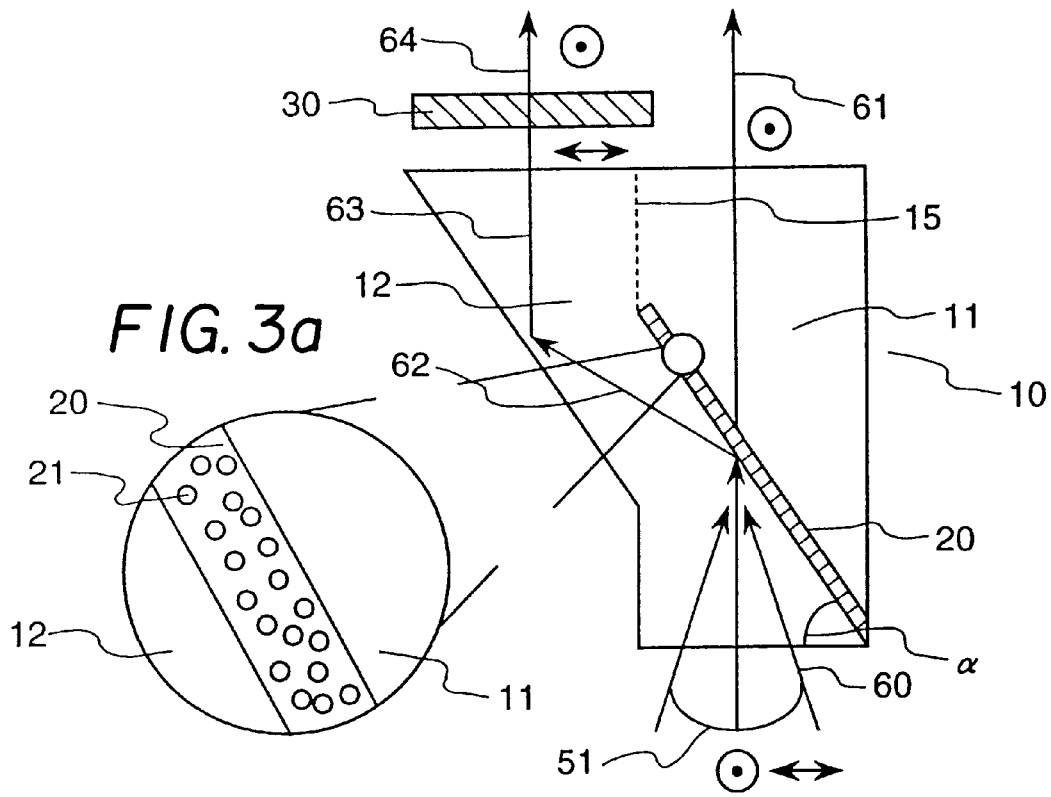
FIG.3a
FIG.4
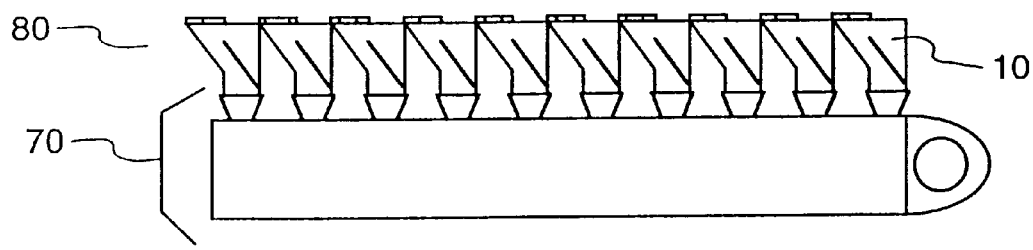

LIQUID CRYSTAL DISPLAY POLARIZING BEAM SPLITTER WITH SPECIFIC INCIDENCE ANGLE

BACKGROUND OF THE INVENTION

The present invention relates to a polarizing beam splitter, a polarizing beam converter and a liquid crystal display for converting the non-polarized light from an illumination source to linearly polarized light.

In recent years, there have been remarkable advances in liquid crystal display technology, especially in the provision of a color liquid crystal display apparatus, so that various kinds of color liquid display apparatus now being provided are found to have a display quality higher than that of a CRT display apparatus. However, since the light produced by a light source is non-polarized light in conventional systems, as in the case of TN-type liquid crystal devices, almost half of the incident light is absorbed by the polarizing plate arranged at the incident side of the display device, so that the efficiency of light utilization is low and the display images are not as bright as desired. There is also a problem that the electric power consumption increases when an attempt is made to obtain brighter display images.

In recent systems, the use of polarizing beam converters using inorganic materials has been proposed in order to increase the efficiency of light utilization (Japanese Patent Application Laid-Open Number 5-241103 1993)). The polarizing beam splitter or the polarizing beam converter used in the conventional projection type liquid crystal display apparatus, which is formed by building multiple dielectric layers on a glass plate cut at 45°, has a large angular dependency. And furthermore, since glass materials are used, the display apparatus is heavy and its cost is high.

SUMMARY OF THE INVENTION

An object of the present invention is to provide a polarizing beam splitter and a polarizing beam converter which make it possible to produce a light-weight apparatus, while resolving such problems as a high cost of manufacture of the apparatus and a narrow angle margin.

Another object of the present invention is to provide a liquid crystal display apparatus using the above polarizing beam converter.

In the polarizing beam splitter of the present invention, uniaxial anisotropic transparent medium is inserted and supported between two isotropic transparent media, and the main axis of the uniaxial anisotropic transparent medium is arranged to be almost perpendicular to the incident light, or the incident surface of the incident light, at the interface between the isotropic transparent medium and the uniaxial anisotropic transparent medium so as to split the incident light into two components.

The polarizing beam converter of the present invention includes the polarizing beam splitter arranged to be almost perpendicular to the incident light, or the incident surface of the incident light, and a half wavelength plate is installed to intercept either the light component reflected by or the light component transmitted through at the interface between the polarizing beam converter and the polarizing beam splitter, which is inclined by 45° relative to the polarization axis of the incident light, so as to rotate the polarization axis of the light passing through the half wavelength plate to match the polarization axis of the other light component.

It is preferable that, in the above described uniaxial anisotropic transparent medium, the refractive index anisotropic factor $\Delta n$ is 1.0 or more, and that the refractive index defined in the major axis of the uniaxial anisotropic transparent medium is almost equivalent to the refractive index $n_p$ of the isotropic transparent medium. In addition, the isotropic transparent medium is composed of organic polymers, and the uniaxial anisotropic transparent medium is composed of liquid crystals or polymer-based liquid crystals.

BRIEF DESCRIPTION OF THE DRAWINGS

These and other objects, features and advantages of the present invention will be understood more clearly from the following more detailed description with reference to the accompanying drawings.

FIG. 1 is a schematic cross section showing one embodiment of the polarizing beam converter of the present invention and FIG. 1a is an enlarged view of a portion thereof.

FIG. 2 is a schematic cross section showing another embodiment of the polarizing beam converter of the present invention and FIG. 2a is an enlarged view of a portion thereof.

FIG. 3 is a schematic cross section showing a further embodiment of the polarizing beam converter of the present invention and FIG. 3a is an enlarged view of a portion thereof.

FIG. 4 is a schematic cross section showing one form of a back light of the transparent-type liquid crystal display apparatus using the polarizing beam converter of the present invention.

DESCRIPTION OF THE PREFERRED EMBODIMENTS

At first, the principle of operation of the present invention will be described. In general, when the light goes into a medium having a refractive index between $n_0$ and $n_1$, the incident light is totally reflected when $n_0 \sin\theta_0 \geq n_1$, where $\theta_0$ is the angle of incidence.

Figure 1:
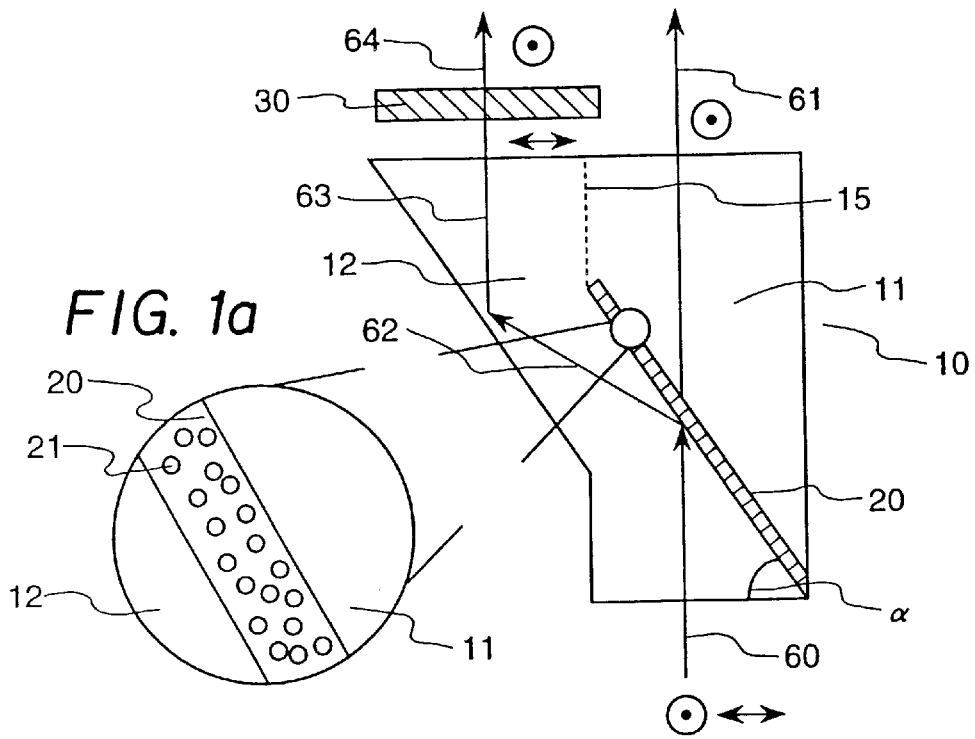

As shown in FIG. 1, the uniaxial anisotropic transparent medium 20 having a refractive index anisotropic factor $\Delta n$ is inserted between isotropic transparent media 11 and 12 so that the major axis of the uniaxial anisotropic transparent medium 20 is perpendicular to the sheet of the drawing. The refraction index $n_p$ of the isotropic transparent media 11, 12 and the refraction index $n_e$ of the uniaxial anisotropic transparent medium 20 defined in the direction of its major axis are made to be equivalent to each other, and the inclination angle $\alpha$ is defined so that $n_p \sin\alpha \geq (n_e - \Delta_n)$ is satisfied.

When the configuration and relevant parameters are defined as indicated above, the incident light 60 which is non-polarized light, is processed in the following manner. Since the polarized light component directed in parallel with the sheet of the drawing (S-polarized light) propagates with the refractive index $(n_e - \Delta_n)$ of the uniaxial anisotropic transparent medium 20 defined in its minor axis direction at the interface between the isotropic transparent medium 12 and the uniaxial anisotropic transparent medium 20, where ne is the refractive index of the uniaxial anisotropic transparent medium 20 defined in its major axis direction, the polarized light component (P-polarized light) directed perpendicular to the sheet of the drawing passes through the medium 20 as outgoing light 61, and S-polarized light is totally reflected as reflected light 62. Thus, a polarization separation of light components can be realized by using the uniaxial anisotropic transparent medium 20 in this way.

And furthermore, as shown in FIG. 1, if a half wavelength plate 30 is arranged so as to be inclined by 45° relative to the S-polarized light component, the totally reflected light 63, after passing through the half wavelength plate 30, becomes transmitted light 64 with its polarization direction rotated by 90°. A polarization separation of the incident light into two components can be realized with this configuration, and by synthesizing one of the polarized components of the non-polarized light 60 after it has passed through the half wavelength plate 30 and is merged with the other component, the non-polarized light 60 can be fully converted into linearly polarized light.

When organic polymer materials are used as the isotropic transparent medium in order to establish a lightweight device, under the condition that the refractive index of the isotropic organic polymer material is at most 1.7 and the abnormal direction refractive index of the anisotropic polymer liquid crystal for compensating the refractive index of the isotropic organic polymer or the liquid crystal is 1.7, since the refractive index anisotropic factor $\Delta n$ is about 0.3, it is preferable to set the incident angle at the interface between the isotropic transparent medium and the anisotropic medium to 55° or more, in order to totally reflect one of the polarized light components. And furthermore, in considering the diffusion of the light from the light source, the incident angle should be made larger to take into consideration the diffusion angle. For example, since the diffusion angle of the light from the light source generally used is within ±5°, it is preferable to make the incident angle 60° or more. With this configuration, a polarizing beam splitter with enough margin for the incident angle can be obtained.

As described later, by applying the polarizing beam converter using the above described polarizing beam splitter to a projection-type liquid crystal display apparatus, a light beam with its cross section shaped vertically wide can be formed, the region of the light not used for developing the display image can be reduced, the light utilization efficiency of the light source can be increased, and the uniformity of the luminance on the display image can be improved. In addition, since the light from the polarizing beam converter is obtained by converting the non-polarized light component of the light emitted from the light source to linearly polarized light, the light absorption in the polarizing beam converter can be reduced remarkably, and hence, a high-quality projected image can be obtained with less temperature rise (less degradation of the polarizing beam converter).

Various preferred embodiments of the present invention will now be described with reference to the drawings.

EMBODIMENT 1

FIG. 1 shows a schematic cross section of one embodiment of the polarizing beam converter of the present invention. As for the material for the isotropic transparent media 11 and 12, poly (penta-bromo-phenyl-methachrylate with a refraction index $n_p$ of 1.71) is used, and a nematic liquid crystal RDP-20778 made by RODIC (the abnormal direction refraction index ne being 1.708 and the birefringence $\Delta n$ being 0.196) is used for the material for the uniaxial anisotropic transparent media 20. The inclined angle $\alpha$ of the isotropic transparent media 12 is set to be 65°, and the theoretical critical total reflection angle is 62.3°.

The alignment layers composed of about 10 nm thickness RN718 made by Nissan Chemical Co. Ltd. are coated and finished using a rubbing process on both interfaces the liquid crystals of the isotropic transparent media 11 and 12, respectively, so that the liquid crystal molecules 21 of the uniaxial anisotropic transparent medium 20 may be aligned homogeneously. The liquid crystal material of the uniaxial anisotropic transparent medium 20 is inserted and supported between the liquid crystal materials of isotropic transparent media 11 and 12, and the overall liquid crystal layer so obtained is formed so as to be about 20 mm in thickness. The thickness of the alignment layer is made to be sufficiently small and the thickness of the overall liquid crystal layer is made to be sufficiently large in relation to the wavelength of the light. The dashed line 15 represents a functional boundary or interface between the isotropic transparent media 11 and 12.

The incident white non-polarized light 60 is projected onto the polarizing beam splitter so formed as described above. The incident light 60 reaching the uniaxial anisotropic transparent medium 20 is separated into a P-polarized light component 61 (transmitted light) polarized in a direction perpendicular to the sheet of the drawing and an S-polarized light component 62 (totally reflected light) polarized in a direction parallel to the sheet of the drawing.

As described above, the P-polarized light component is transmitted through the uniaxial anisotropic transparent medium 20 with a light propagation property similar to that in the isotropic transparent media, and the S-polarized light component is totally reflected due to the difference in the refraction indices at the interface between those transparent media. The S-polarized light 62, which is reflected totally by the medium 20 is reflected again at the interface between the isotropic transparent media 12 and the outside atmosphere (air layer) and then becomes totally reflected light 63. On the surface of the isotropic transparent media 12 forming an interface with the outside atmosphere (air layer), a reflection media, for example, an aluminum evaporation film, is developed in order to reflect the S-polarized light component 62 as totally reflected light 63. In some cases, an aluminum surface mirror coated with a reflection enhancing coating composed of a dielectric multiple layer may be used for the reflection media.

By measuring the polarization status of the transmitted P-polarized light component 61 and the totally reflected light component 63, it has been proven that the P-polarized light component polarized in a direction perpendicular to the sheet of the drawing and the S-polarized light component polarized in a direction parallel to the sheet of the drawing are obtained as a pair of linearly polarized lines with their polarized directions being orthogonal. The intensity ratio between the transmitted P-polarized light component and the S-polarized light component is more than 100:1. It is preferable to form an anti-reflection layer on the incident surface and the outgoing surface of the isotropic transparent media 11 and 12.

In the above described structure, in case the delay axis of the half wave length plate 30 (retardation film) in the visible region is made to be inclined by 45° to the polarization direction of the totally reflected light component 63, an outgoing light component 64 can be finally obtained as linearly polarized light having a polarized face defined in the same direction as that of the P-polarized light component 61. The half wavelength plate 30 (retardation film) is composed of film made of poly-vinyl-alcohol and is made to have a designated multiple-refraction property so as to operate as a half wavelength plate. In this structure, plural retardation films are employed for defining a half wavelength plate in the visible region. This half wavelength plate 30 also may be placed at the outgoing side of the P-polarized light.

EMBODIMENT 2

Figure 2:
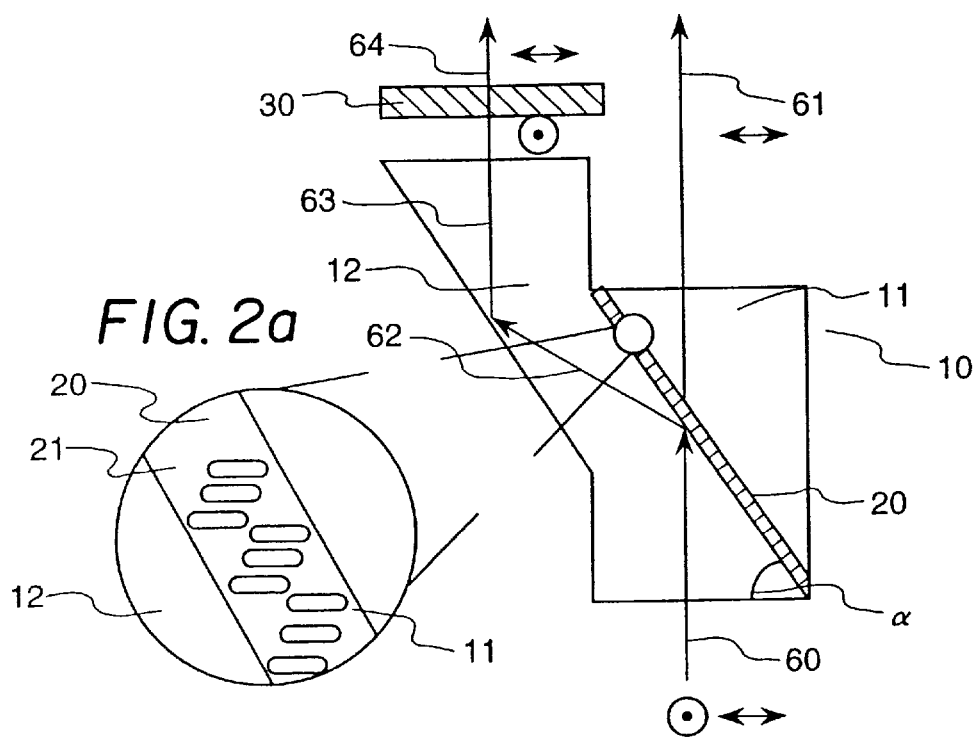

FIG. 2 is a schematic cross section showing another embodiment of the polarizing beam converter of the present invention. As the material for the isotropic transparent media 11 and 12, poly (penta-bromo-phenyl-methachrylate with a refraction index $n_p$ of 1.71) is used, and a nematic liquid crystal RDP-20778 made by RODIC (the abnormal direction refraction index $n_e$ being 1.708 and the birefringence $\Delta n$ being 0.196) is used for the material for the uniaxial anisotropic transparent media 20. The inclined angle $\alpha$ of the isotropic transparent media 12 is made to be 70°, and the theoretical total reflection angle is 62.3°.

Similar to the embodiment 1, on both interfaces for the isotropic transparent media 11 and 12, a polyimide alignment layer formed by a polymerizing diammine component containing a long chain alkyl substitute and a tetracarbonyl acid bi-anhydride is coated with 10 nm thickness, and after hardening of the coating, a rubbing process is performed so that the liquid crystal molecules 21 of the uniaxial anisotropic transparent medium 20 may be aligned homogeneously. However, in contrast to embodiment 1, the liquid crystal molecules 21 are aligned in a parallel direction tilted about 65° relative to the interface. Thus, in this embodiment, as seen in FIG. 2, the S-polarized light component will pass through the medium 20, while the P-polarized component will be totally reflected thereby.

The liquid crystal of the uniaxial anisotropic transparent medium 20 is inserted and supported between the liquid crystal materials of isotropic transparent media 11 and 12, and the overall liquid crystal layer so obtained is formed so as to be about 20 mm in thickness. The thickness of the alignment layer is made to be sufficiently small and the thickness of the overall liquid crystal layer is made to be sufficiently large in relation to the wavelength of the light.

The incident white non-polarized light 60 is projected onto the polarizing beam splitter so formed as described above. By measuring the polarization status of the transmitted S-polarized light component 61 and the totally reflected P-polarized light component 63, it has been proven that the P-polarized light component polarized in a direction perpendicular to the sheet of the drawing and the S-polarized light component polarized in a direction parallel to the sheet of the drawing are obtained as a pair of linearly polarized lines with their polarized directions being orthogonal. The intensity ratio between the transmitted S-polarized light component and the P-polarized light component is more than 100:1. It is preferable to form anti-reflection layer on the incident surface and the outgoing surface of the isotropic transparent media 11 and 12.

In the above described structure, in case the delay axis of the half wave length plate 30 (retardation film) in the visible region is inclined by 45° to the polarization direction of the totally reflected light component 63, an outgoing light component 64 can be finally obtained as linearly polarized light having a polarized face defined in the same direction as that of the S-polarized light component 61. The retardation film 30 also may be placed at the side of the P-polarized light component.

EMBODIMENT 3

In the apparatus of FIGS. 1 and 2, the isotropic transparent media 11 and 12 was made in this embodiment of poly (vinyl naphthalene) (the refraction index $n_p$ being 1.682), and a nematic liquid crystal RDP-00362 made by RODIC (the abnormal direction refraction index $n_e$ being 1.686 and the birefringence $\Delta n$ being 0.179) was used as the material for the uniaxial anisotropic transparent media 20. Also, in this embodiment, the inclined angle $\alpha$ of the isotropic transparent media 12 was made to be 70°, and the theoretical critical total reflection angle was 63.4°. Other features of this embodiment are the same as in the embodiments 1 and 2, and so the same effects can be obtained.

In the above described structure, in case the delay axis of the half wave length plate 30 (retardation film) in the visible region is inclined by 45° to the polarization direction of the totally reflected light component 63, outgoing light 64 can be finally obtained as linearly polarized light having a polarized face defined in the same direction as that of the polarized light component 61. The half wavelength plate 30 may be placed at the side of the polarized light component.

EMBODIMENT 4

In the apparatus of FIGS. 1 and 2, this embodiment uses, as the material for the isotropic transparent media 11 and 12, poly (a-naphthyl-methacrylate) (the refraction index $n_p$ being 1.641), and a nematic liquid crystal RDP-20776 made by RODIC (the abnormal direction refraction index $n_e$ being 1.645 and the birefringence $\Delta n$ using 0.139) is used for the material for the uniaxial anisotropic transparent media 20. The inclined angle $\alpha$ of the isotropic transparent media 12 is set to be 70°, and the theoretical critical total reflection angle is 66.3°. Other features of this embodiment are the same as in the embodiments 1 and 2, and so the same effects can be obtained.

In the above described structure, in case the delay axis of the half wave length plate 30 (retardation film) in the visible region is made to be inclined by 45° to the polarization direction of the totally reflected light component 63, outgoing light 64 can be finally obtained as linearly polarized light having a polarized face defined in the same direction as that of the polarized light component 61. The half wavelength plate 30 also may be placed at the side of the polarized light component 61.

EMBODIMENT 5

FIG. 3 is a schematic cross section showing a further embodiment of the polarizing beam converter of the present invention. The materials used for the isotropic transparent media 11 and 12 and the uniaxial anisotropic transparent media 20 are the same as those used in the embodiment 2. The inclined angle $\alpha$ of the isotropic transparent media 12 is set to be 70°, and the theoretical critical total reflection angle is 62.3°.

The alignment layers composed of about 10 nm thickness RN718 made by Nissan Chemical Co. Ltd. are coated and finished using a rubbing process both interfaces of the liquid crystals of the isotropic transparent media 11 and 12, respectively. The liquid crystal material of the uniaxial anisotropic transparent medium 20 is inserted and supported between the liquid crystals of isotropic transparent media 11 and 12, and the overall liquid crystal layer so obtained is formed so as to be about 20 mm thickness. The thickness of the alignment layer is made to be sufficiently small and the thickness of the overall liquid crystal layer is made to be sufficiently large in relation to the wavelength of the light.

The incident white non-polarized light 60 is projected onto the polarizing beam splitter so formed as described above. By measuring the polarization status of the transmitted P-polarized light component 61 and the totally reflected light component 63, it has been proven that the P-polarized light component polarized in a direction perpendicular to the sheet of the drawing and the S-polarized light component polarized in a direction parallel to the sheet of the drawing are obtained as a pair of linearly polarized lines with their polarized directions being orthogonal.

In case of a projection-type display, the diffusion angle 51 of the light from the light source generally used is within ±5°. By measuring the polarization status of the transmitted P-polarized light component 61 and the totally reflected light component 63, even if the incident white light enters with a diffusion angle of about ±5°, it has been proven that the P-polarized light component polarized in a direction perpendicular to the sheet of the drawing and the S-polarized light component polarized in a direction parallel to the sheet of the drawing are obtained as a pair of linearly polarized lines with their polarized directions being orthogonal. The intensity ratio between the transmitted P-polarized light component and the S-polarized light component is more than 100:1. It is preferable to form an anti-reflection layer on the incident surface and the outgoing surface of the isotropic transparent medium 11.

By defining the inclined angle α so as to establish a total reflection angle in consideration of the diffusion of the light from the light source, a polarizing beam converter having larger angle margin can be realized.

A 90°-twist nematic liquid crystal is used in this embodiment for the rotator instead of the half wavelength plate 30 (retardation film). The 90°-twist nematic liquid crystal is a nematic liquid crystal in which $\Delta n \cdot d$ is 0.45 mm, and it has been proven that the P-polarized light component polarized in a direction perpendicular to the sheet of the drawing and the S-polarized light component polarized in a direction parallel to the sheet of the drawing are obtained as a pair of linearly polarized lines with their polarized directions being orthogonal. The 90°-twist nematic liquid crystal also may be placed at the side of the P-polarized light component 61. O-PET, a polymer material having high refraction index, made by Kanebo, Co. Ltd., also may be used for the isotropic transparent media 11 and 12 in this embodiment.

Though a liquid crystal material is used for the uniaxial anisotropic transparent medium 20, it is possible to use a polymer-based liquid crystal and thin film. By using organic polymer based materials for the isotropic transparent media, lightweight and low-cost devices can be produced. In this embodiment, a liquid crystal in which the refractive index anisotropic factor $\Delta n$ is 0.1 or more is used for the uniaxial anisotropic transparent medium 20. This is because the refractive index anisotropic factor $\Delta n$ is required to be 0.1 or more in considering the diffusion of the light from the light source and the design margin related to this diffusion effect, and because a sufficient polarization effect can not be obtained by a liquid crystal with a Dn which is less than 0.1 with the incident light having a diffusion angle of about ±5°.

As the refractive index of a transparent organic polymer material is at most 1.7, the inclined angle α is preferably made to be 55° or more. In case the refractive index anisotropic factor $\Delta n$ of the uniaxial anisotropic transparent medium 20 is about 0.2, it is preferable to make the inclined angle α 60° or more, and furthermore, in considering the diffusion effect of the incident light, the inclined angle α is preferably 65° or more. In the embodiment shown in FIG. 3, for the half wavelength plate 30, it is possible to use a liquid crystal aligned as a uniaxial anisotropic transparent medium instead of the 90°-twist nematic liquid crystal.

EMBODIMENT 6

In the apparatus of FIG. 1, this embodiment uses, as the material for the isotropic transparent media 11 and 12, inorganic material LaKs (the refraction index $n_p$ is 1.74), and a nematic liquid crystal E-63 made by MELC (the abnormal direction refraction index $n_e$ being 1.7444 and the birefringence $\Delta n$ being 0.2272) is used as the material for the uniaxial anisotropic transparent media 20.

The inclined angle α of the isotropic transparent media 12 in this embodiment is set to be 65°, and the theoretical critical total reflection angle is 60.4°. The alignment layers composed of about 10 nm thickness RN718 made by Nissan Chemical Co. Ltd. are coated and finished using a rubbing process on both interfaces of the liquid crystals of the isotropic transparent media 11 and 12, respectively, so that the liquid crystal molecules 21 of the uniaxial anisotropic transparent medium 20 may be aligned homogeneously.

The liquid crystal material of the uniaxial anisotropic transparent medium 20 is inserted and supported between the liquid crystals of isotropic transparent media 11 and 12, and the overall liquid crystal layer so obtained is formed so as to be about 20 mm in thickness. The thickness of the alignment layer is made to be sufficiently small and the thickness of the overall liquid crystal layer is made to be sufficiently large relative to the wavelength of the light.

The incident white non-polarized light 60 is projected onto the polarizing beam splitter so formed as described above. The incident light 60 reaching the uniaxial anisotropic transparent medium 20 is separated into a P-polarized light component 61 (transmitted light) polarized in a direction perpendicular to the sheet of the drawing and an S-polarized light component 62 (totally reflected light) polarized in a direction parallel to the sheet of the drawing.

By measuring the polarization status of the transmitted P-polarized light component 61 and the totally reflected light component 63, it has been proven that the P-polarized light component polarized in a direction perpendicular to the sheet of the drawing and the S-polarized light component polarized in a direction parallel to the sheet of the drawing are obtained as a pair of linearly polarized lines with their polarized directions being orthogonal. The intensity ratio between the transmitted polarized light component and the S-polarized light component is more than 100:1. It is preferable to form an anti-reflection layer on the incident surface and the outgoing surface of the isotropic transparent media 11 and 12.

In the above described structure, in case the delay axis of the half wave length plate 30 (retardation film) in the visible region is inclined by 45° to the polarization direction of the totally reflected light component 63, outgoing light 64 can be finally obtained with as linearly polarized light having a polarized face defined in the same direction as that of the P-polarized light component 61.

The half wavelength plate 30 (retardation film) is composed of a film made of poly-vinyl-alcohol and is made to have a designated multiple-refraction property so as to operate as a half wavelength plate. In this structure, plural retardation films are provided for defining a half wavelength plate in the visible region. This half wavelength plate 30 also may be place at the side of the P-polarized light component 61.

In this embodiment, though LaK is used as the material for the isotropic transparent media 11 and 12, it is possible to use other optical materials having a similar refractive index, such as LaF and LaSF. Also, as described above, inorganic materials to be used for the isotropic transparent media 11 and 12 provide a higher refractive index more easily than organic materials do, and hence, the incident angle can be further reduced.

EMBODIMENT 7

Figure 5:
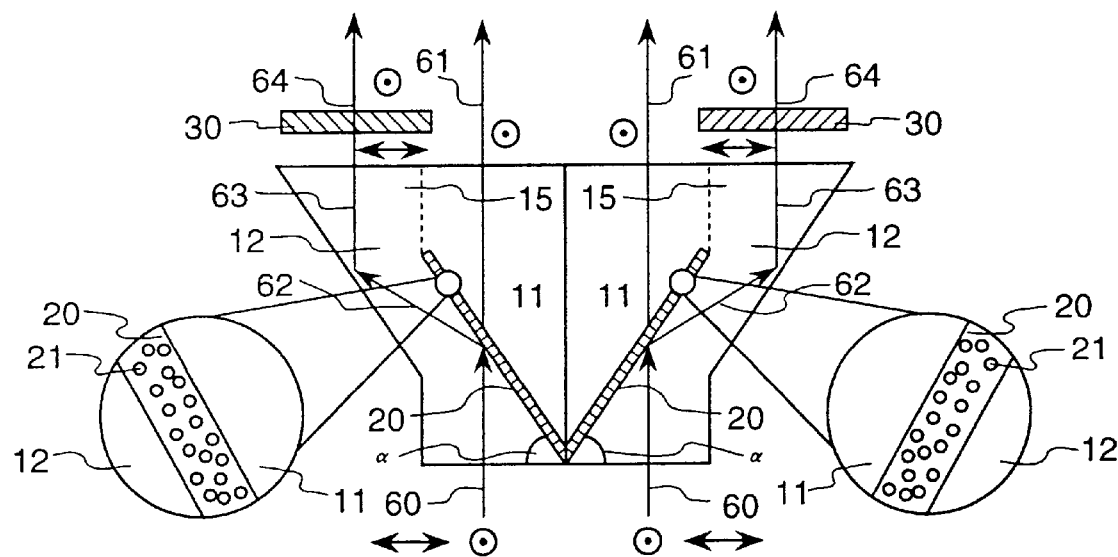
FIG. 5 is a schematic cross section showing still another embodiment of the polarizing beam converter of the present invention.

FIG. 5 is a schematic cross section of a polarizing beam converter composed of a pair of polarizing beam converters of the type shown in FIG. 1. The polarizing beam converter composed of two polarizing beam converters in this embodiment makes it possible to improve the light utilization and the uniformity of the luminance on the display image.

FIG. 4 is a schematic cross section showing one form of a back light of a transparent-type liquid crystal display apparatus using the polarizing beam converter of the present invention.

By arranging plural polarizing beam converters of the type described in the embodiments shown in FIGS. 1 to 3 on the back light of the liquid crystal display apparatus in which a parallel light is projected, as disclosed in U.S. Pat. No. 5,396,350, an illumination apparatus is produced, which makes it possible to expose the polarized light efficiently. Since the exposed light beam obtained from the light source in the back light of the liquid crystal display apparatus is not coherent, but is diversified, the inclined angle $\alpha$ is required to be sufficiently larger than the theoretical critical totally reflected angle. In a preferable case, the inclined angle $\alpha$ may be larger than the theoretical critical totally reflected angle by at least 10°.

A position adjustment using a part protruding from the light source is desired in order to establish a coherent light beam from the back light 70. The protruding part has a structure in which the top part of a truncated pyramid, formed by cutting off the top of the pyramid, is made to contact the back light 70, and plural truncated pyramids are arranged in a geometrical array. With this structure, the light from the back light enters the truncated pyramid of the protruding part, is reflected totally at the inside face of the truncated pyramid and, finally, the coherent light beam is emitted from the top of the truncated pyramid. Before reaching the truncated pyramid, the diversified light beam coming directly from the back light travels up and down and is totally reflected between the interfaces. Therefore, by means of the polarizing beam converters being placed in accordance with the position at which a highly coherent light beam from the protruding part can be obtained, a light beam efficiently processed with polarization conversion can be obtained.

Figure 6:
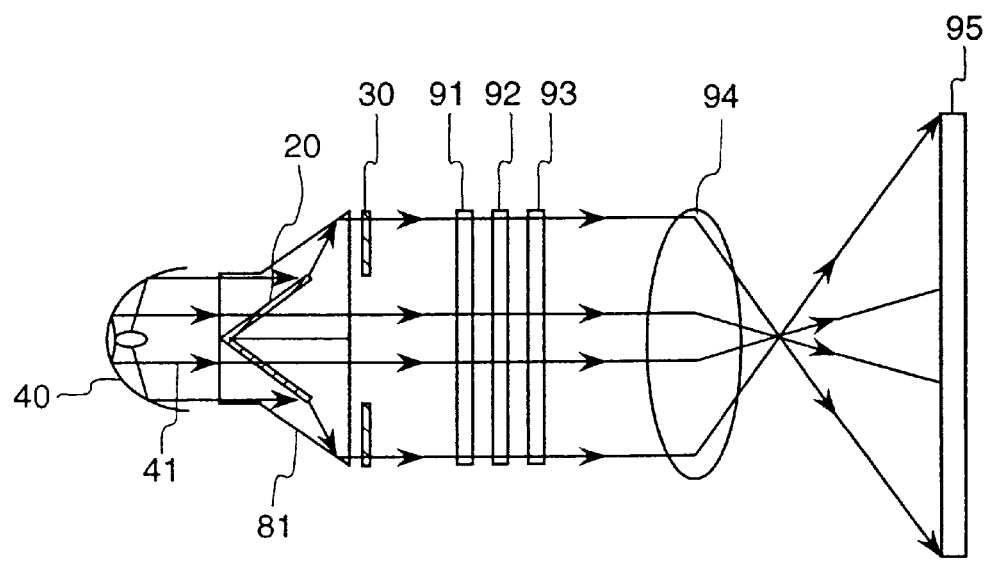
FIG. 6 is a schematic cross section showing a projection-type liquid crystal display apparatus using the polarizing beam converter of the present invention.

FIG. 6 is a structural representation of a projection-type liquid crystal display apparatus using the polarizing beam converter of the present invention. The projection-type liquid crystal display apparatus is composed of a liquid crystal display device 92 having an aspect ratio of 9:16, a polarization element 91, an optical sensing element 93, a projection lens 94 for projecting the display image developed by the liquid crystal display device 92 onto a backside screen 95, and a polarizing beam converter 81, according to the present invention, providing the interfaces of the uniaxial anisotropic transparent media 20 and the half wave length plate 30 for converting the polarization direction.

Figure 7A:
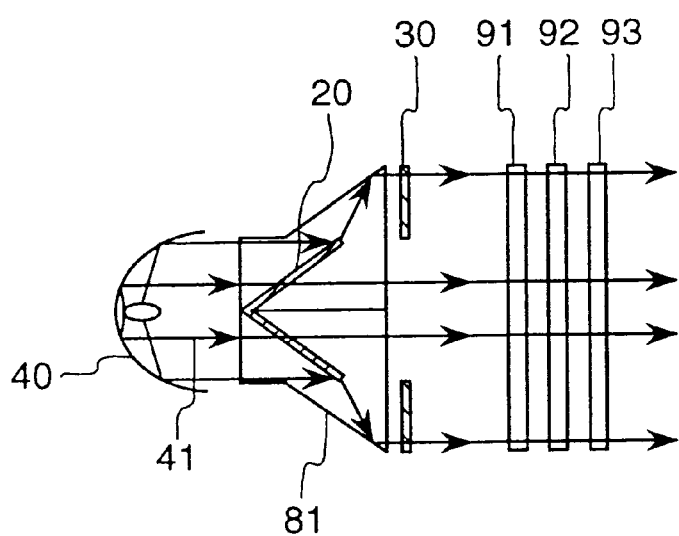
FIGS. 7A and 7B are longitudinal and transverse schematic cross sections, respectively, showing the trajectory of the projected light from the light source of the projection-type liquid crystal display apparatus using the polarizing beam converter of the present invention.

In FIG. 7A, the beam coherence and trajectory of the projected light 41 from the light source 40 in FIG. 6 is shown. The light beam of the projection light 41 emitted from the light source 40 is separated into a pair of linearly polarized light beams, represented by a P-polarized light component and a S-polarized light component, and their polarization directions intersect with a diagonal line with respect to each other perpendicularly at the interfaces defined by the uniaxial anisotropic transparent media 20 in the polarizing beam converter 81.

The P-polarized light component passes through the uniaxial anisotropic transparent media 20 and is directed onto the liquid crystal display device 92. On the other hand, the S-polarized light component is reflected at the interface of the uniaxial anisotropic transparent media 20 and is then reflected totally at the interface between the isotropic transparent media 12 and the outside atmosphere (or is reflected at a reflection film at the boundary of the isotropic transparent media), and finally, a P-polarized light is obtained from the totally reflected S-polarized light component by rotating the linear polarization direction thereof by 90° using the half wave length plate 30 (or a 90° twist nematic liquid crystal 31). As in the previously described embodiments, it is also possible to convert the P-polarized component light to S-polarized light in order to obtain uniformly polarized light.

Therefore, the light beam emitted from the light source 40 is converted to linearly polarized light composed of light beams polarized in a uniform direction. In comparing this result with the conventional method in which no polarization conversion is provided, the conversion efficiency for converting the light emitted from the light source to linearly polarized light becomes twice that of the conventional method, and not only is the efficiency of light utilization improved, but also, since the light absorption et the polarization element is reduced to be about 1/5 and no temperature rise is produced in the polarization element, the degradation of the polarization element 91 which leads to a major cause of the reduction in the quality of the projected display image can be prevented.

Figure 7B:
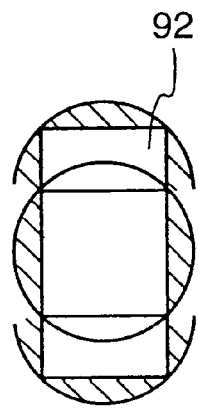

What is shown in FIG. 7B is that the projected light 41 is separated into a P-polarized light component and an S-polarized light component with their polarization directions intersecting perpendicularly at the interface of the uniaxial anisotropic transparent medium of the polarizing beam converter 81, and that those polarized light components are synthesized into a single synthesized light beam having its cross section shaped vertically wide, as seen in FIG. 7B. Since FIG. 7A is a top-view of the light beam, the cross section shape seems to be horizontally wide, but this is not the case. Though the region marked with a hatched line in FIG. 7B is not used for projecting a display image, the substantial size of this region is smaller than the case without polarization conversion, and hence, the efficiency of the light utilization of the projected light is remarkably increased.

In the intensity distribution of the light beam emitted from the light source 40, the intensity at the center is highest, and the intensity at the peripheral parts is smaller. However, by synthesizing the S-polarized light component contained in the high-intensity light beam located in the central part using the half wave length plate 30 of the polarizing beam converter 81, as the peripheral parts are exposed by the polarized light beam, a uniform intensity distribution of the exposed light on the liquid crystal display device 92 can be obtained. At this time, by making the incline angle α shown in FIG. 1 correspond to the sum of the critical total reflection angle and the diversified angle of the light source, the degree of polarization of the linearly polarized light from the polarizing beam converter 81 can be increased.

In accordance with the present invention, by using organic polymer materials for the isotropic transparent media 11 and 12, the weight of the polarizing beam splitter can be made to be about half the weight of the conventional polarizing beam splitter made of glass. On the other hand, it is possible to use an isotropic transparent medium made of inorganic materials.

As for the retardation film used as the half wave length plate 30 for which poly-vinyl-alcohol may be used, polymer-based films, such as poly-carbonate and polystyrene, also may be used. In addition, the half wave length plate is more effective by rotating the optical axis of plural retardation films in order to compensate the wave length dependency due to the multi-reflective property of the multilayers films. As for the polarizing beam converter, the polarizing beam converters shown in FIGS. 2 and 3 can be used. In addition, as for the light source, the high luminance white light source, such as a metal halide lamp, a xenon lamp and a halogen lamp, can be used.

As for the liquid crystal for the liquid crystal display device, twist nematic liquid crystal, super twisted nematic liquid crystal, ferroelectric liquid crystal, anti-ferroelectric liquid crystal and electrically controlled birefringence liquid crystal are used in order to develop the display image by controlling the polarization status. As for the method of driving the liquid crystal display device, an active matrix method and multiplex single matrix method can be used. As for the active device, a MOS transistor, a polysilicon TFT, an amorphous silicon TFT and a MIM can be used.

The liquid crystal display device can be used for display images in monochrome or in color using color filters. In case the projected light from the light source is decomposed into three primary colors, red, green and blue using a color separation apparatus, such as dichroic mirror, dichroic prism and hologram in order to display color images, a similar projection-type liquid crystal display apparatus of the above embodiment can be used.

According to the present invention, by using the refraction index anisotropic property of the uniaxial anisotropic media of the polarizing beam converter using the polarizing beam splitter of the present invention, a polarizing beam converter which establishes a high conversion performance efficiency, a wider margin for the incident angle and which is light in weight can be realized. And furthermore, by applying the polarizing beam converter to a projection-type liquid crystal display apparatus, the uniformity of the luminance distribution of the display image can be improved.

Since the cross sectional shape of the light beam can be efficiently used, a projection-type liquid crystal display apparatus having a higher efficiency of light utilization can be realized.

What is claimed is:

1. A polarizing beam splitter, wherein
   a uniaxial anisotropic transparent medium is inserted and supported between isotropic transparent media;
   an optical axis of said uniaxial anisotropic transparent medium is arranged almost perpendicular to incident light or an incident face of said incident light at an interface between said isotropic transparent medium and said uniaxial anisotropic transparent medium; and
   a refraction index $n_p$ of said isotropic medium and a refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle.

2. A polarizing beam splitter, wherein
   a uniaxial anisotropic transparent medium having birefringence Δn being 0.1 or more is inserted and supported between isotropic transparent media;
   an optical axis of said uniaxial anisotropic transparent medium is arranged almost perpendicular to incident light or an incident face of said incident light at an interface between said isotropic transparent medium and said uniaxial anisotropic transparent medium; and
   a refraction index $n_p$ of said isotropic medium and a refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle.

3. A polarizing beam splitter, wherein
   a uniaxial anisotropic transparent medium having a refractive index $n_e$ in an optical axis almost identical to a refractive index of an isotropic transparent medium is inserted and said supported between isotropic transparent media;
   an optical axis of said uniaxial anisotropic transparent medium is arranged almost perpendicular to incident light or an incident face of said incident light at an interface between said isotropic transparent medium and said uniaxial anisotropic transparent medium; and
   a refraction index $n_p$ of said isotropic medium and said refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle.

4. A polarizing beam splitter, wherein a uniaxial anisotropic transparent medium having a refractive index $n_e$ in an optical axis almost identical to a refractive index of an isotropic transparent medium and having a birefringence Δn being 0.1 or more is inserted and said supported between isotropic transparent media;
   an optical axis of said uniaxial anisotropic transparent medium is arranged almost perpendicular to incident light or an incident face of said incident light at an interface between said isotropic transparent medium and said uniaxial anisotropic transparent medium; and
   a refraction index $n_p$ of said isotropic medium and said refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle.

5. The polarizing beam splitter of claim 1, 2, 3 or 4, wherein said isotropic transparent media is composed of an organic polymer material; and
   an incident angle of said incident light relative to said interface of said isotropic transparent media is 55° or more.

6. A polarizing beam converter, comprising a polarizing beam splitter, wherein
   a uniaxial anisotropic transparent medium is inserted and supported between isotropic transparent media;
   an optical axis of said uniaxial anisotropic transparent medium is arranged almost perpendicular to incident light, or an incident face of said incident light, at an interface between said isotropic transparent medium and said uniaxial anisotropic transparent medium; and a refraction index $n_p$ of said isotropic medium and a refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle;

wherein a half wavelength plate is placed with a inclined angle of 45° relative to a polarization axis to intercept either of a light reflected at or light transmitted through said interface.

7. The polarizing beam converter of claim 6, wherein said uniaxial anisotropic transparent medium has a birefringence Δn of 0.1 or more.

8. The polarizing beam converter of claim 6, wherein said isotropic transparent media is composed of an organic polymer materia; and an incident angle of incident light relative to said interface of said isotropic transparent media is 55° or more.

9. The polarizing beam converter of claim 6, wherein said half wavelength plate is formed as a twisted nematic liquid crystal cell without transparent electrodes and polarizing plates, said twisted nematic liquid crystal cell being twisted by 90°.

10. The polarizing beam converter of claim 6, wherein said uniaxial anisotropic transparent medium is composed of a polymer-based liquid crystal.

11. A polarizing beam converter, comprising a polarizing beam splitter, wherein a uniaxial anisotropic transparent medium is inserted and supported between isotropic transparent media;

an optical axis of said uniaxial anisotropic transparent medium is arranged almost perpendicular to incident light, or an incident face of said incident light, at an interface between said isotropic transparent medium and said uniaxial anisotropic transparent medium; and a refraction index $n_p$ of said isotropic medium and a refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle;

wherein at least two half wavelength plates operating as polarizing beam converters are placed with a inclined angle of 45° relative to a polarization axis for either of light reflected at or light transmitted through said interface; and said polarizing beam converter further comprises a polarizing beam splitting surface for splitting a non-polarized light into a P-polarized light component and a S-polarized light component, with the mutual polarizing directions thereof intersecting in orthogonal axes.

12. A polarizing beam converter of claim 11, wherein an inclined angle to said incident light of said polarizing beam splitting surface for splitting non-polarized light into a P-polarized light component and a S-polarized light component is 70° or less.

13. A liquid crystal display apparatus wherein plural polarizing beam converters are placed on a luminance apparatus of a direct-viewing-type liquid display apparatus;

said polarizing beam converters, formed as a half wavelength plates, have an inclined angle of 45° relative to a polarization axis for either of light reflected at or light transmitted through an interface of a polarizing beam splitter;

said polarizing beam splitter is so configured that a uniaxial anisotropic transparent medium is inserted and supported between isotropic transparent media;

an optical axis of said uniaxial anisotropic transparent medium is arranged almost perpendicular to incident light, or an incident face of said incident light, at an interface between said isotropic transparent medium and said uniaxial anisotropic transparent medium; and a refraction index $n_p$ of said isotropic medium and a refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle.

14. A projection-type liquid crystal display apparatus having a liquid crystal display device; and a light source and a projection lens for projecting a display image developed by a liquid crystal display device onto a screen surface, comprising:

a polarizing beam converter, having a polarizing beam splitting surface for splitting a non-polarized light into a P-polarized light component and a S-polarized light component, the mutual polarizing directions thereof intersecting in orthogonal;

wherein a uniaxial anisotropic transparent medium is inserted and supported between isotropic transparent media;

an optical axis of said uniaxial anisotropic transparent medium is arranged almost perpendicular to incident light, or an incident face of said incident light, at an interface between said isotropic transparent medium and said uniaxial anisotropic transparent medium; and a refraction index $n_p$ of said isotropic medium and a refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle;

wherein a half wavelength plate is placed with an inclined angle of 45° relative to a polarization axis for either of light reflected at or light transmitted through said interface.

15. A projection-type liquid crystal display apparatus of claim 14, wherein at least two polarizing beam converters are provided.

16. A polarizing beam splitter, wherein a uniaxial anisotropic transparent medium having a thickness thicker than a wavelength of a visual light is inserted and supported between isotropic transparent media;

an optical axis of said uniaxial anisotropic transparent medium is arranged almost perpendicular to incident light or an incident face of said incident light at an interface between said isotropic transparent medium and said uniaxial anisotropic transparent medium; and a refraction index $n_p$ of said isotropic medium and a refraction index $n_e$ greater than $n_0$ of said uniaxial anisotropic transparent medium are substantially equal to each other, and at an interface of said isotropic medium and said uniaxial anisotropic transparent medium, an incident angle θ is an angle satisfying $\sin(\theta) \geq n_0/n_p$ for satisfying a total reflection angle.

* * * * *